US012754835B2

(12) United States Patent
Bert

(10) Patent No.: US 12,754,835 B2
(45) Date of Patent: Oct. 6, 2026

(54) ADDRESS MAPPING TABLE FOR A MEMORY SUB-SYSTEM USING MIXED TRANSLATION UNIT SIZES

(71) Applicant: Micron Technology, Inc., Boise, ID (US)

(72) Inventor: Luca Bert, Bologna (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/967,299

(22) Filed: Dec. 3, 2024

(65) Prior Publication Data

US 2025/0217282 A1 Jul. 3, 2025

Related U.S. Application Data

(60) Provisional application No. 63/616,457, filed on Dec. 29, 2023.

(51) Int. Cl.
*G06F 12/02* (2006.01)

(52) U.S. Cl.
CPC .. *G06F 12/0246* (2013.01); *G06F 2212/7201* (2013.01)

(58) Field of Classification Search
CPC ..................... G06F 12/0246; G06F 2212/7201
See application file for complete search history.

(56) References Cited

U.S. PATENT DOCUMENTS 8,205,033 B2 6/2012 Saeki et al.
10,222,984 B1 * 3/2019 O'Brien, III .......... G06F 3/0644
10,817,417 B1 * 10/2020 Zhang .................... G06F 3/0608
11,385,798 B1 * 7/2022 Vanmak ................ G06F 3/0616
2012/0166713 A1 6/2012 Saeki et al.
2019/0079681 A1 * 3/2019 Trika .................... G06F 3/0604
2020/0401334 A1 * 12/2020 Saxena ................... G06F 3/064
2021/0026781 A1 * 1/2021 Dong .................. G06F 12/0246
2022/0129189 A1 * 4/2022 Zhou ..................... G06F 3/0655
2022/0245067 A1 8/2022 Liu
2022/0382681 A1 12/2022 Bhardwaj

FOREIGN PATENT DOCUMENTS

CN 113094119 B 7/2022

OTHER PUBLICATIONS

International Search Report and Written Opinion for International Application No. PCT/US2024/062157, mailed Apr. 17, 2025, 09 Pages.

* cited by examiner

*Primary Examiner* — Edward J Dudek, Jr.
(74) *Attorney, Agent, or Firm* — Lowenstein Sandler LLP

(57) ABSTRACT

A processing device in a memory sub-system receives a plurality of requests to write data to a non-volatile memory device, the plurality of requests comprising respective numbers of input/output (I/O) chunks of a fixed size, and performs a plurality of write operations to write the data to the non-volatile memory device using respective translation units, wherein the respective translation units comprise two or more different translation unit sizes selected based on the respective numbers of I/O chunks of the plurality of requests.

20 Claims, 5 Drawing Sheets

ADDRESS MAPPING TABLE FOR A MEMORY SUB-SYSTEM USING MIXED TRANSLATION UNIT SIZES

RELATED APPLICATIONS

This application claims the benefit of U.S. Provisional Patent Application Ser. No. 63/616,457 filed Dec. 29, 2023, the entire contents of which are hereby incorporated by reference herein.

TECHNICAL FIELD

Embodiments of the disclosure relate generally to memory sub-systems, and more specifically, relate to an address mapping table for a memory sub-system using mixed translation unit sizes.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
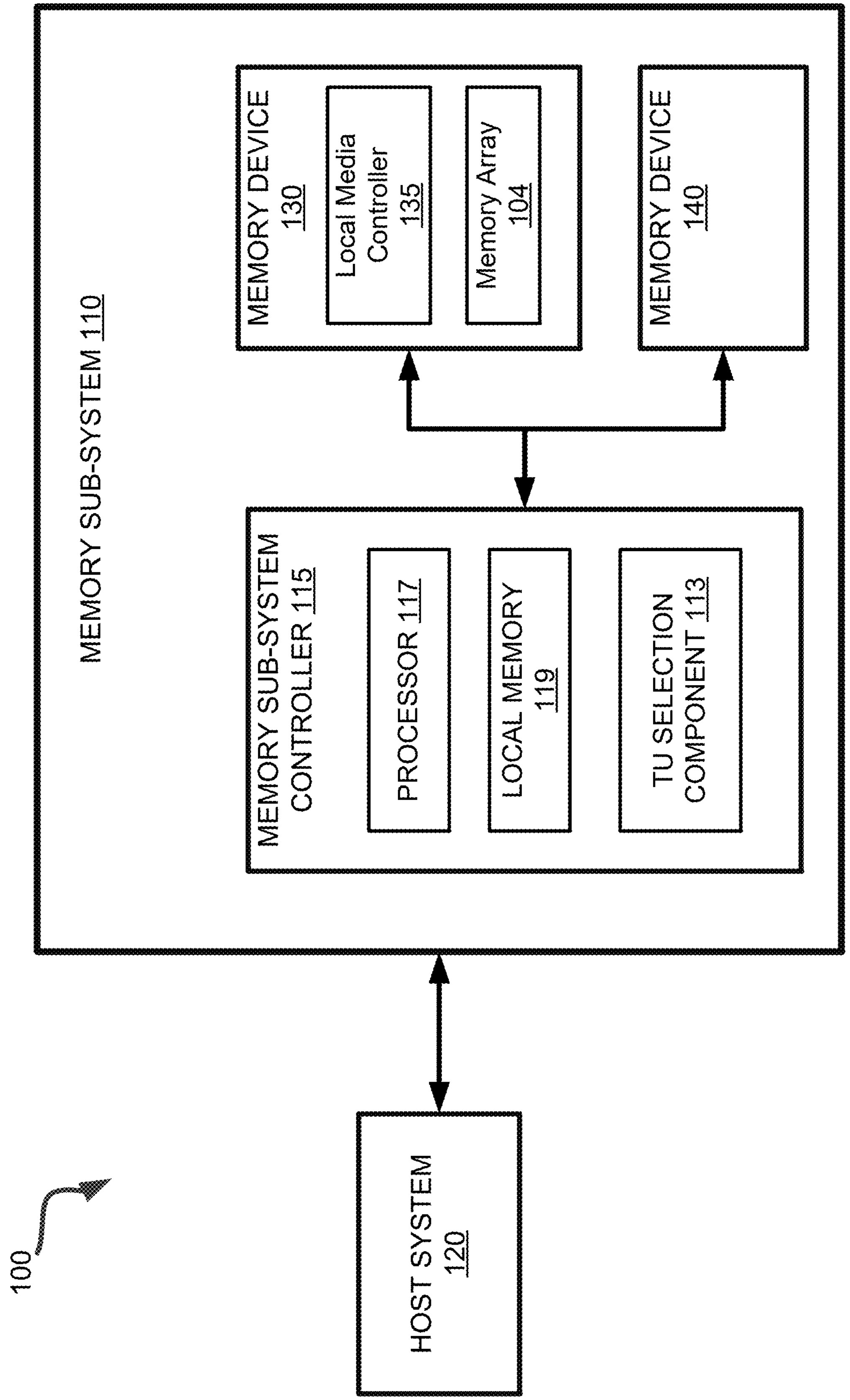
FIG. 1 illustrates an example computing system that includes a memory sub-system in accordance with some embodiments of the present disclosure.

Aspects of the present disclosure are directed to an address mapping table for a memory sub-system using mixed translation unit sizes. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more dice, each including one or more planes. For some types of non-volatile memory devices (e.g., NAND memory), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane.

One example of a memory sub-system is a solid-state drive (SSD) that includes one or more non-volatile memory devices and a memory sub-system controller to manage the non-volatile memory devices. Certain memory sub-systems use a Flash Translation Layer (FTL) to translate logical addresses of memory access requests, often referred to as logical block addresses (LBAs), to corresponding physical memory addresses, which can be stored in one or more FTL mapping tables. In some instances, the FTL mapping table can be referred to as a logical-to-physical (L2P) mapping table storing L2P mapping information, at least a portion of which may be stored in volatile memory (e.g., Dynamic Random Access Memory (DRAM)) in the memory sub-system so that it can be accessed with minimal latency. During operation, the memory sub-system can receive one or more input/output (I/O) chunks of data (e.g., from a host system) to be stored. Each I/O chunk can be represented by a corresponding LBA and can have a fixed size (e.g., 4 kilobytes) that is set, for example, by the host system. The received data is then written to the non-volatile memory devices at corresponding physical memory addresses at a granularity referred to as a translation unit (TU). The translation unit is the base granularity of data managed by the memory sub-system and can include a predefined number of logical units (e.g., logical pages, logical blocks, etc.). Certain memory devices implement a translation unit size that is equal to the I/O chunk size (e.g., 4 kilobytes). When the translation unit is written to the physical memory address, the memory sub-system controller can create a corresponding entry in the L2P mapping table indicating the correlation between the LBA and the physical memory address. Thus, the L2P mapping table can include an entry for every translation unit written to the non-volatile memory device. As the size of the non-volatile memory device increases (e.g., into the tens of terabytes), the size of the volatile memory needed to store the L2P mapping information quickly surpasses practical limitations including cost, physical size, power utilization, etc.

One approach that can reduce the amount of L2P mapping information, and thus the size of the volatile memory, is to increase the translation unit size. For example, if the host data were written to the non-volatile memory device in larger chunks (e.g., 8 kilobytes or 16 kilobytes) the number of entries in the L2P mapping table could be proportionally reduced. Utilizing a larger translation unit size, however, can lead to increased write amplification when the I/O chunk size is small (e.g., smaller than the translation unit size). For example, if an I/O chunk of 4 kilobytes of host data is received, but the translation unit size being utilized is 16 kilobytes, the memory sub-system controller will read 16 kilobytes of data from the non-volatile memory device, modify 4 kilobytes of the read data, and write the full 16 kilobytes back to the non-volatile memory device. In such an example, an extra 12 kilobytes of identical data is read from and then written back to the non-volatile memory device in order to write the 4 kilobytes of new host data to the non-volatile memory device. This can be referred to as a write amplification factor of four (4). Certain types of non-volatile memory devices, such as those implemented using quad-level cell (QLC) memory, for example, are particularly susceptible to adverse effects when such write application is present. For example, the additional write operations can cause the non-volatile memory device to wear out much faster and suffer additional disturb errors, which hurts the lifetime and reliability of the memory device.

Aspects of the present disclosure address the above and other deficiencies by implementing an address mapping table for a memory sub-system using mixed translation unit sizes. In one embodiment, the memory sub-system controller receives a number of requests to write data to a non-volatile memory device of the memory sub-system. The requests can be received, for example, from a host system, and can include respective numbers of input/output (I/O) chunks of a fixed size (e.g., 4 kilobytes). Some requests may be relatively small and include, for example, one or two I/O chunks, thus having a total size of 4 kilobytes or 8 kilobytes. Other requests may be relatively large and include, for example, many I/O chunks, thus having a total size of many hundreds of kilobytes. In one embodiment, the memory sub-system performs write operations to write the received data to the non-volatile memory device using respective translation units of different sizes. The respective translation units can include two or more different translation unit sizes which are selected based on the respective numbers of I/O chunks in the different requests. For example, if the number of I/O chunks in a given request is less than a threshold amount (e.g., less than 4 chunks totaling 16 kilobytes), the memory sub-system controller may write the data to the non-volatile memory device using a translation unit having a first size (e.g., 4 kilobytes). If, however, the number of I/O chunks in the request is greater than or equal to the threshold amount (e.g., greater than or equal to 4 chunks totaling 16 kilobytes), the memory sub-system controller may write the data to the non-volatile memory device using a translation unit having a second size (e.g., 16 kilobytes). In either case, the memory sub-system controller further maintains an address mapping table on a volatile memory device to map a logical block address associated with the request to a physical address corresponding to the translation unit.

Advantages of the approach described herein include, but are not limited to, improved performance in the memory sub-system. In practice, the majority of write requests are relatively large and include many I/O chunks. Accordingly, using a larger translation unit size for these write operations significantly reduces the number of entries in the L2P mapping table, which therefore reduces the necessary size of the volatile memory used to store the L2P mapping information. This frees more physical space in the memory sub-system, as well as reduces the overall cost and power utilization. For those few write requests that are small, using a smaller translation unit size prevents unnecessary write amplification which improves reliability and endurance of the non-volatile memory device.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., one or more memory device(s) 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., the one or more memory device(s) 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory device(s) 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device(s) 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory device(s) 130. The memory sub-system controller 115 can further include host interface circuitry to communicate with the host system 120 via the physical host interface. The host interface circuitry can convert the commands received from the host system into command instructions to access the memory device(s) 130 as well as convert responses associated with the memory device(s) 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device(s) 130.

In some embodiments, the memory device(s) 130 include local media controllers 135 that operate in conjunction with memory sub-system controller 115 to execute operations on one or more memory cells of the memory device(s) 130. An external controller (e.g., memory sub-system controller 115) can externally manage the memory device 130 (e.g., perform media management operations on the memory device(s) 130). In some embodiments, a memory device 130 is a managed memory device, which is a raw memory device (e.g., memory array 104) having control logic (e.g., local controller 135) for media management within the same memory device package. An example of a managed memory device is a managed NAND (MNAND) device. Memory device(s) 130, for example, can each represent a single die having some control logic (e.g., local media controller 135) embodied thereon. In some embodiments, one or more components of memory sub-system 110 can be omitted.

In one embodiment, the memory sub-system 110 includes a translation unit (TU) selection component 113 that can implement an address mapping table for memory sub-system 110 using mixed translation unit sizes. As noted above, the translation unit selection component 113 can determine whether a number of I/O chunks of a fixed size associated with a memory access request received from host system 120 satisfies a threshold criterion. In one embodiment, the number of I/O chunks satisfies the threshold criterion if the number of I/O chunks is less than a threshold amount (e.g., 4 I/O chunks totaling 16 kilobytes), and does not satisfy the threshold criterion if the number of I/O chunks is greater than or equal to the threshold amount. Responsive to determining that the number of I/O chunks satisfies the threshold criterion, the translation unit selection component 113 can select a translation unit having a first size (e.g., 4 kilobytes) and can perform a first write operation to write the data to non-volatile memory device 130 using translation unit(s) of the first size. If, however, the number of I/O chunks does not satisfy the threshold criterion, the translation unit selection component 113 can select a translation unit having a second, larger, size (e.g., 16 kilobytes) and can perform a write operation to write the data to non-volatile memory device 130 using translation unit(s) of the second size. Further details with regard to the operations of the translation unit selection component 113 are described below.

Figure 2:
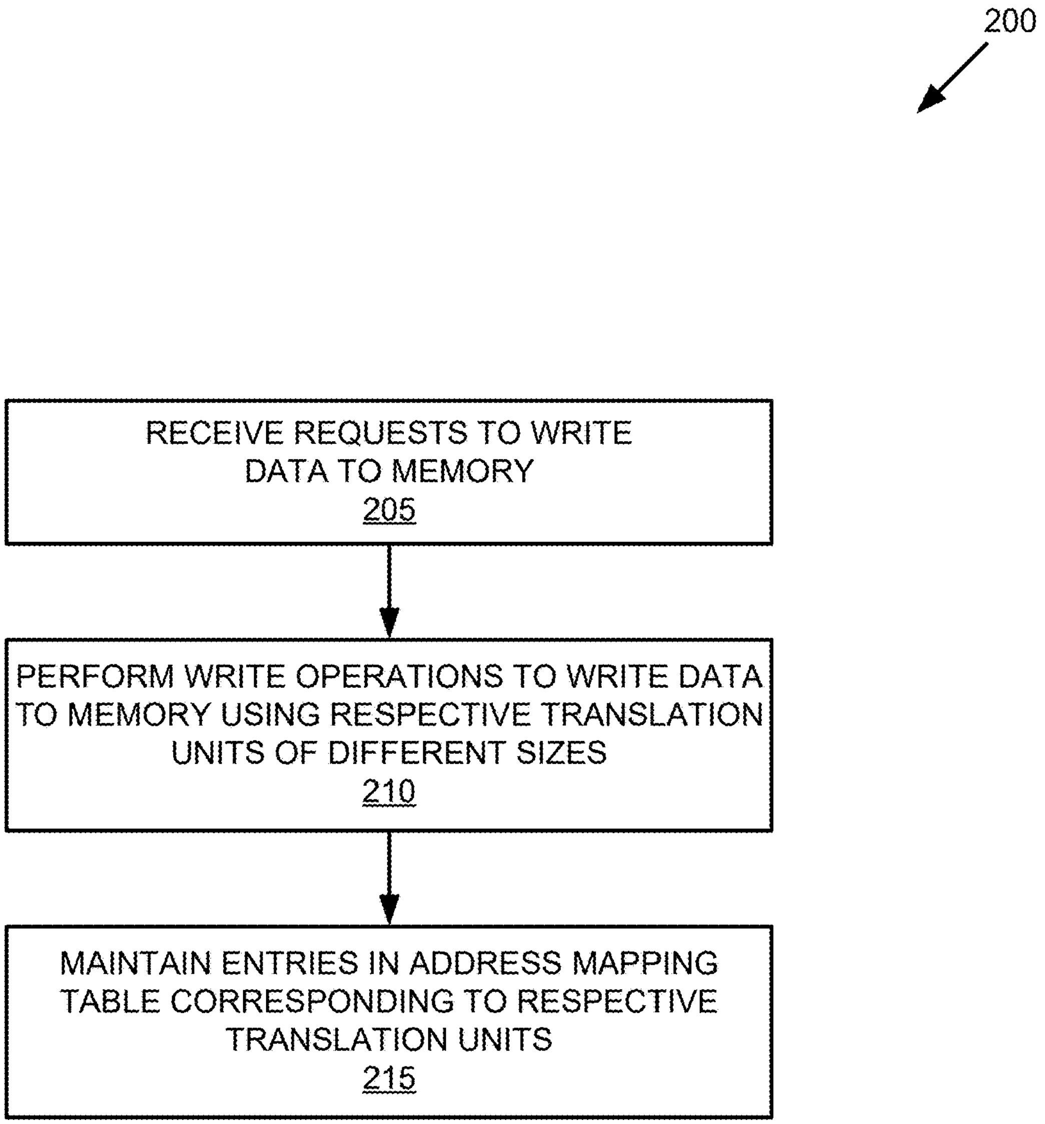
FIG. 2 is a flow diagram of an example method of address mapping in a memory sub-system using mixed translation unit sizes in accordance with some embodiments of the present disclosure.

FIG. 2 is a flow diagram of an example method of address mapping in a memory sub-system using mixed translation unit sizes in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the translation unit selection component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 3:
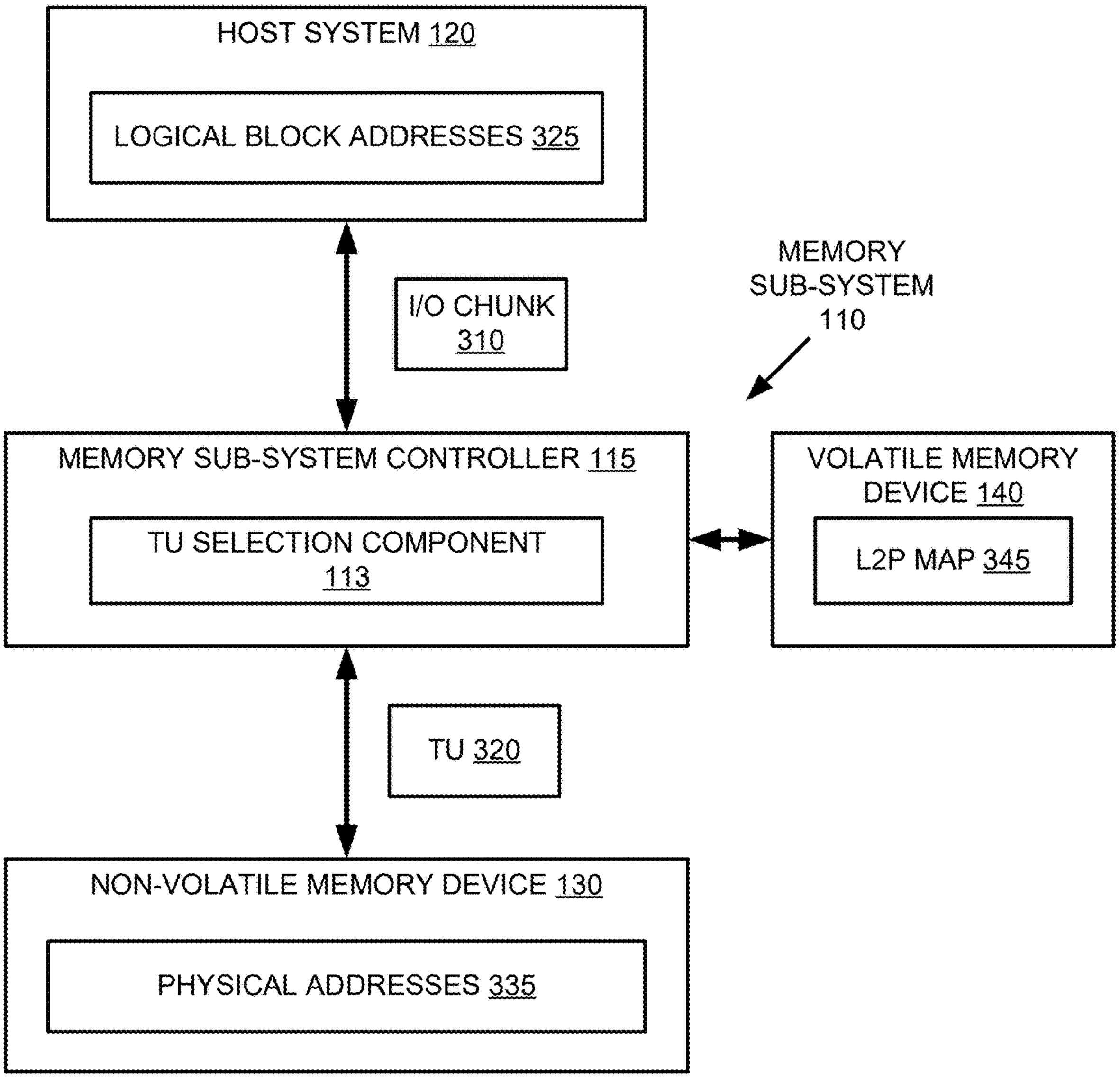
FIG. 3 is a block diagram illustrating a computing system with an address mapping table for a memory sub-system using mixed translation unit sizes in accordance with some embodiments of the present disclosure.

At operation 205, the processing logic (e.g., the translation unit selection component 113) receives requests to write data to a non-volatile memory device, such as memory device 130. In one embodiment, as illustrated in FIG. 3, the requests are received by memory sub-system controller 115 of memory sub-system 110, from a requestor, such as host system 120. In one embodiment, each request includes a respective number of I/O chunks 310 of a fixed size, and has one or more associated logical block addresses 325. Depending on the nature of the request, the request can include any number of I/O chunks 310 (e.g., one or two I/O chunks up to hundreds of I/O chunks). For example one request may include two I/O chunks, while a subsequent request may include 64 I/O chunks. In one embodiment, the I/O chunks 310 have a fixed size (e.g., 4 kilobytes) that is set by the host system 120. Thus, the number of I/O chunks 310 is representative of the total size of the data to be written by the write request.

At operation 210, the processing logic performs a plurality of write operations to write the requested data to the non-volatile memory device 130 using respective translation units, such as translation unit 320 of FIG. 3. The respective translation units 320 can include two or more different translation unit sizes selected based on the respective numbers of I/O chunks 310 of the plurality of requests. In one embodiment, the translation unit selection component 113 determines the number of I/O chunks 310 in each request, which is representative of the total size of the data to be written by the write request, and selects a translation unit size for the translation units 320 to use when writing the data to corresponding physical addresses 335 in the non-volatile memory device 130. For example, in one embodiment described in more detail below with respect to FIG. 4, the translation unit selection component 113 can select a first translation unit size (e.g., 4 kilobytes) for the translation units 320 if the number of I/O chunks is less than a threshold amount, and can select a second, larger, translation unit size (e.g., 16 kilobytes) for the translation units 320 if the number of I/O chunks is greater than or equal to the threshold amount. Once the translation unit size is selected, the processing logic can write the data using translation units 320 of the selected size to the corresponding physical addresses 335 in the non-volatile memory device 130.

At operation 215, the processing logic maintains a plurality of entries in an address mapping table, such as L2P mapping table 345 on the volatile memory device 140 of FIG. 3, to map the logical block addresses 325 associated with the write requests to the physical addresses 335 corresponding to the respective translation units 320. When each translation unit 320 is written to the physical memory address 335, the processing logic can create a corresponding entry in the L2P mapping table 345 indicating the correlation between the logic block address of the data and the physical memory address where it is written. Thus, the L2P mapping table 345 can include an entry for every translation unit 320 written to the non-volatile memory device 130. Accordingly, if the translation units 320 have a larger translation unit size, there will be less entries in the L2P mapping table 345, and a smaller volatile memory device 140 will be required. In some embodiments, only a portion of the L2P mapping information is maintained on volatile memory device 140, while a remainder of the L2P mapping information can be maintained elsewhere, such as on non-volatile memory device 130.

Figure 4:
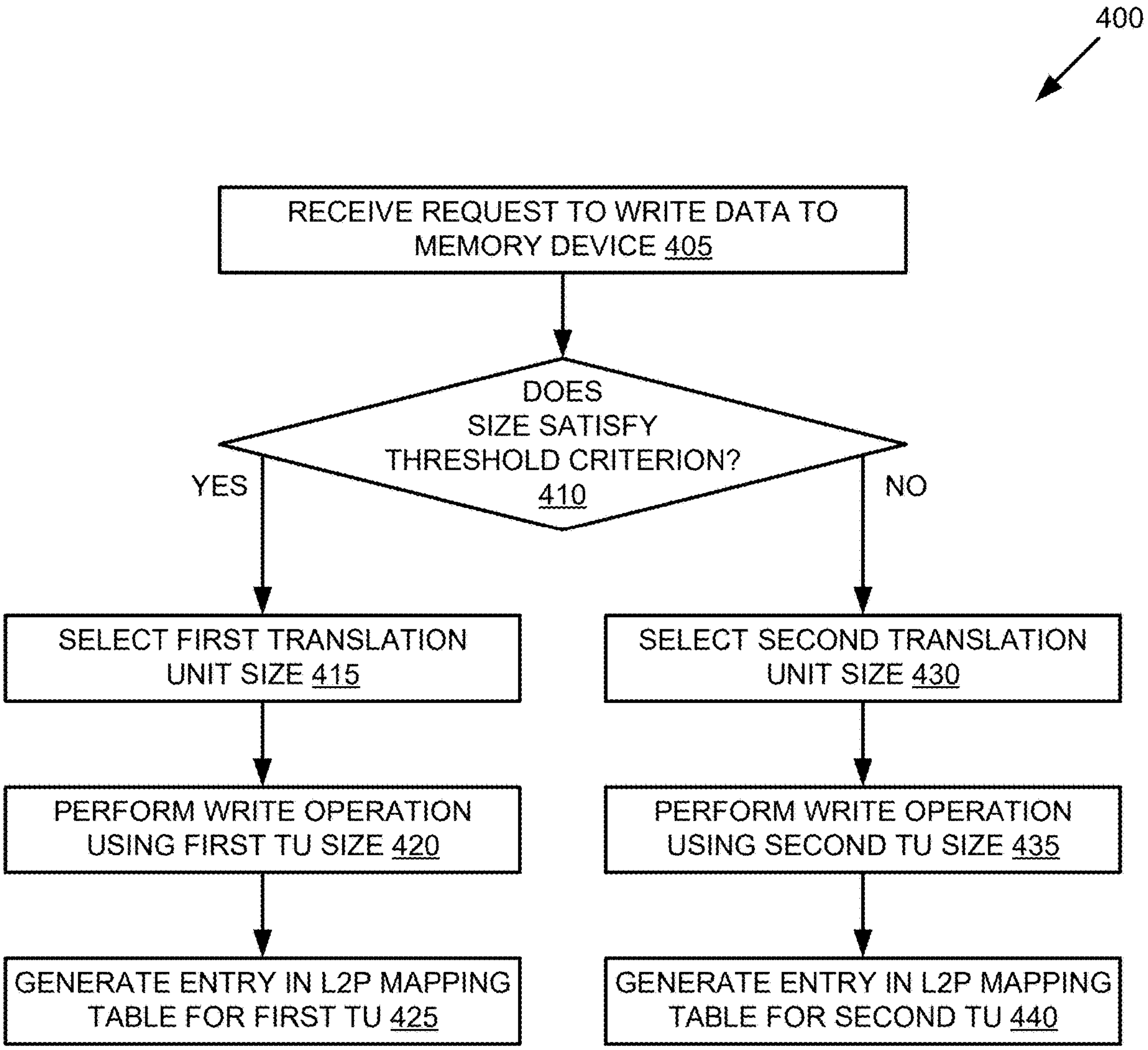
FIG. 4 is a flow diagram of an example method of address mapping in a memory sub-system using mixed translation unit sizes in accordance with some embodiments of the present disclosure.

FIG. 4 is a flow diagram of an example method of address mapping in a memory sub-system using mixed translation unit sizes in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the translation unit selection component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing logic (e.g., the translation unit selection component 113) receives a request to write data to a non-volatile memory device, such as memory device 130. In one embodiment, the request is received by memory sub-system controller 115 of memory sub-system 110, from a requestor, such as host system 120. In one embodiment, the request includes a number of I/O chunks 310 of a fixed size, and has one or more associated logical block addresses 325. Depending on the nature of the request, the request can include any number of I/O chunks 310 (e.g., one or two I/O chunks up to hundreds of I/O chunks). In one embodiment, the I/O chunks 310 have a fixed size (e.g., 4 kilobytes) that is set by the host system 120. Thus, the number of I/O chunks 310 is representative of the total size of the data to be written by the write request.

At operation 410, the processing logic determines whether the number of I/O chunks of the fixed size associated with the request satisfies a threshold criterion. In one embodiment, the number of I/O chunks 310 satisfies the threshold criterion if the number of I/O chunks 310 is less than a threshold amount. The threshold amount is configurable according to the specific implementation, but can in one embodiment be 4 chunks (i.e., 16 kilobytes). Conversely, if the number of I/O chunks 310 is greater than or equal to the threshold amount, the processing logic can determine that the number of I/O chunks does not satisfy the threshold criterion.

Responsive to determining that the number of I/O chunks 310 of the fixed size associated with the first request satisfies the threshold criterion, at operation 415, the processing logic selects a first translation unit size. In one embodiment, the first translation unit size is equal to the fixed size of the I/O chunks 310 (i.e., 4 kilobytes). When the translation unit size is equal to the fixed size of the I/O chunks 310, there will not be any unnecessary write amplification that results from writing data to the non-volatile memory device 130. In other embodiments, the first translation unit size may be some other size, such as some other integer multiple of the fixed size of the I/O chunks 310.

At operation 420, the processing logic performs a first write operation to write the first data to the non-volatile memory device 130 using one or more first translation units 320 having the first translation unit size (e.g., 4 kilobytes). As illustrated in FIG. 3, the translation unit selection component 113 can write one or more first translation units 320 to the corresponding physical addresses 335 of memory device 130.

At operation 425, the processing logic generates one or more entries of the address mapping table 345 on the volatile memory device 140 to map a first logical block address 325 associated with the first data to a first physical address 335 corresponding to the one or more first translation units 320.

Responsive to determining that the number of I/O chunks 310 of the fixed size associated with the first request does not satisfy the threshold criterion, at operation 430, the processing logic selects a second translation unit size. In one embodiment, the second translation unit size is larger than the first translation unit size and is equal to some other integer multiple of the fixed size of the I/O chunks 310 (e.g., 4 I/O chunks totaling 16 kilobytes). In other embodiments, the second translation unit size may be some other size, such as some other integer multiple of the fixed size of the I/O chunks 310.

At operation 435, the processing logic performs a second write operation to write the first data to the non-volatile memory device 130 using one or more second translation units 320 having the first translation unit size (e.g., 4 kilobytes). As illustrated in FIG. 3, the translation unit selection component 113 can write one or more second translation units 320 to the corresponding physical addresses 335 of memory device 130.

At operation 440, the processing logic generates one or more entries of the address mapping table 345 on the volatile memory device 140 to map a first logical block address 325 associated with the first data to a first physical address 335 corresponding to the one or more second translation units 320.

Figure 5:
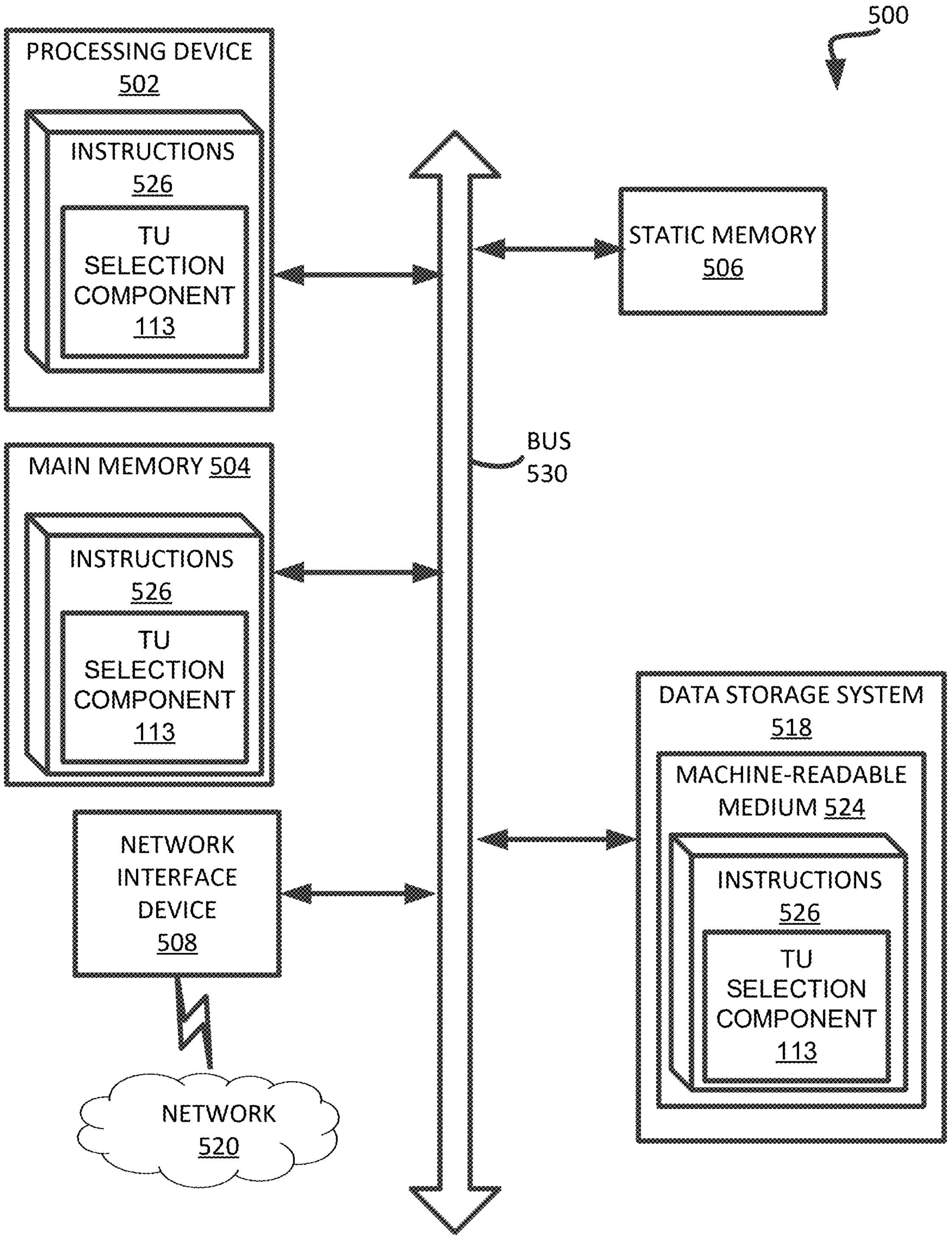
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the translation unit selection component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to the translation unit selection component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a volatile memory device;
a non-volatile memory device; and
a processing device, operatively coupled with the volatile memory device and the non-volatile memory device, to perform operations comprising:
receiving, from a host system, a plurality of requests to write data to the non-volatile memory device, the plurality of requests comprising respective numbers of input/output (I/O) chunks of a fixed size set by the host system; and
performing a plurality of write operations to write the data to the non-volatile memory device using respective translation units, wherein the respective translation units comprise two or more different translation unit sizes selected based on the respective numbers of I/O chunks of the plurality of requests, and wherein a first translation unit size of the two or more different translation unit sizes is equal to the fixed size of the I/O chunks.

2. The system of claim 1, wherein the processing device is to perform operations further comprising:
maintaining a plurality of entries in an address mapping table on the volatile memory device to map logical block addresses associated with the plurality of requests to physical addresses corresponding to the respective translation units.

3. The system of claim 2, wherein the processing device is to perform operations further comprising:

receiving a first request of the plurality of requests to write first data to the non-volatile memory device;

determining whether a number of I/O chunks of the fixed size associated with the first request satisfies a threshold criterion; and responsive to determining that the number of I/O chunks of the fixed size associated with the first request satisfies the threshold criterion, performing a first write operation to write the first data to the non-volatile memory device using one or more first translation units having a first translation unit size.

4. The system of claim 3, wherein the processing device is to perform operations further comprising:

generating a first entry of the plurality of entries in the address mapping table on the volatile memory device to map a first logical block address associated with the first data to a first physical address corresponding to the one or more first translation units.

5. The system of claim 3, wherein the processing device is to perform operations further comprising:

responsive to determining that the number of I/O chunks of the fixed size associated with the first request does not satisfy the threshold criterion, performing a second write operation to write the first data to the non-volatile memory device using one or more second translation units having a second translation unit size, wherein the second translation unit size is larger than the first translation unit size.

6. The system of claim 5, wherein the processing device is to perform operations further comprising:

generating a second entry of the plurality of entries in the address mapping table on the volatile memory device to map a first logical block address associated with the first data to a second physical address corresponding to the one or more second translation units.

7. The system of claim 5, wherein the number of I/O chunks of the fixed size associated with the first request satisfies the threshold criterion when a total size of the I/O chunks is less than 16 kilobytes, wherein the first translation unit size is 4 kilobytes, and wherein the second translation unit size is 16 kilobytes.

8. A method comprising:

receiving, from a host system, a plurality of requests to write data to a non-volatile memory device, the plurality of requests comprising respective numbers of input/output (I/O) chunks of a fixed size set by the host system; and performing a plurality of write operations to write the data to the non-volatile memory device using respective translation units, wherein the respective translation units comprise two or more different translation unit sizes selected based on the respective numbers of I/O chunks of the plurality of requests, and wherein a first translation unit size of the two or more different translation unit sizes is equal to the fixed size of the I/O chunks.

9. The method of claim 8, further comprising:

maintaining a plurality of entries in an address mapping table on a volatile memory device to map logical block addresses associated with the plurality of requests to physical addresses corresponding to the respective translation units.

10. The method of claim 9, further comprising:

receiving a first request of the plurality of requests to write first data to the non-volatile memory device;

determining whether a number of I/O chunks of the fixed size associated with the first request satisfies a threshold criterion; and responsive to determining that the number of I/O chunks of the fixed size associated with the first request satisfies the threshold criterion, performing a first write operation to write the first data to the non-volatile memory device using one or more first translation units having a first translation unit size.

11. The method of claim 10, further comprising:

generating a first entry of the plurality of entries in the address mapping table on the volatile memory device to map a first logical block address associated with the first data to a first physical address corresponding to the one or more first translation units.

12. The method of claim 10, further comprising:

responsive to determining that the number of I/O chunks of the fixed size associated with the first request does not satisfy the threshold criterion, performing a second write operation to write the first data to the non-volatile memory device using one or more second translation units having a second translation unit size, wherein the second translation unit size is larger than the first translation unit size.

13. The method of claim 12, further comprising:

generating a second entry of the plurality of entries in the address mapping table on the volatile memory device to map a first logical block address associated with the first data to a second physical address corresponding to the one or more second translation units.

14. The method of claim 12, wherein the number of I/O chunks of the fixed size associated with the first request satisfies the threshold criterion when a total size of the I/O chunks is less than 16 kilobytes, wherein the first translation unit size is 4 kilobytes, and wherein the second translation unit size is 16 kilobytes.

15. A computer-readable storage medium comprising instructions that, when executed by a processing device, cause the processing device to perform operations comprising:

receiving, from a host system, a plurality of requests to write data to a non-volatile memory device, the plurality of requests comprising respective numbers of input/output (I/O) chunks of a fixed size set by the host system; and performing a plurality of write operations to write the data to the non-volatile memory device using respective translation units, wherein the respective translation units comprise two or more different translation unit sizes selected based on the respective numbers of I/O chunks of the plurality of requests, and wherein a first translation unit size of the two or more different translation unit sizes is equal to the fixed size of the I/O chunks.

16. The computer-readable storage medium of claim 15, wherein the instructions cause the processing device to perform operations further comprising:

maintaining a plurality of entries in an address mapping table on a volatile memory device to map logical block addresses associated with the plurality of requests to physical addresses corresponding to the respective translation units.

17. The computer-readable storage medium of claim 16, wherein the instructions cause the processing device to perform operations further comprising:

receiving a first request of the plurality of requests to write first data to the non-volatile memory device;

determining whether a number of I/O chunks of the fixed size associated with the first request satisfies a threshold criterion; and responsive to determining that the number of I/O chunks of the fixed size associated with the first request satisfies the threshold criterion, performing a first write operation to write the first data to the non-volatile memory device using a one or more first translation units having a first translation unit size.

18. The computer-readable storage medium of claim 17, wherein the instructions cause the processing device to perform operations further comprising:

generating a first entry of the plurality of entries in the address mapping table on the volatile memory device to map a first logical block address associated with the first data to a first physical address corresponding to the one or more first translation units.

19. The computer-readable storage medium of claim 17, wherein the instructions cause the processing device to perform operations further comprising:

responsive to determining that the number of I/O chunks of the fixed size associated with the first request does not satisfy the threshold criterion, performing a second write operation to write the first data to the non-volatile memory device using a one or more second translation units having a second translation unit size, wherein the second translation unit size is larger than the first translation unit size.

20. The computer-readable storage medium of claim 19, wherein the instructions cause the processing device to perform operations further comprising:

generating a second entry of the plurality of entries in the address mapping table on the volatile memory device to map a first logical block address associated with the first data to a second physical address corresponding to the one or more second translation units.

* * * * *